Patented Oct. 4, 1938

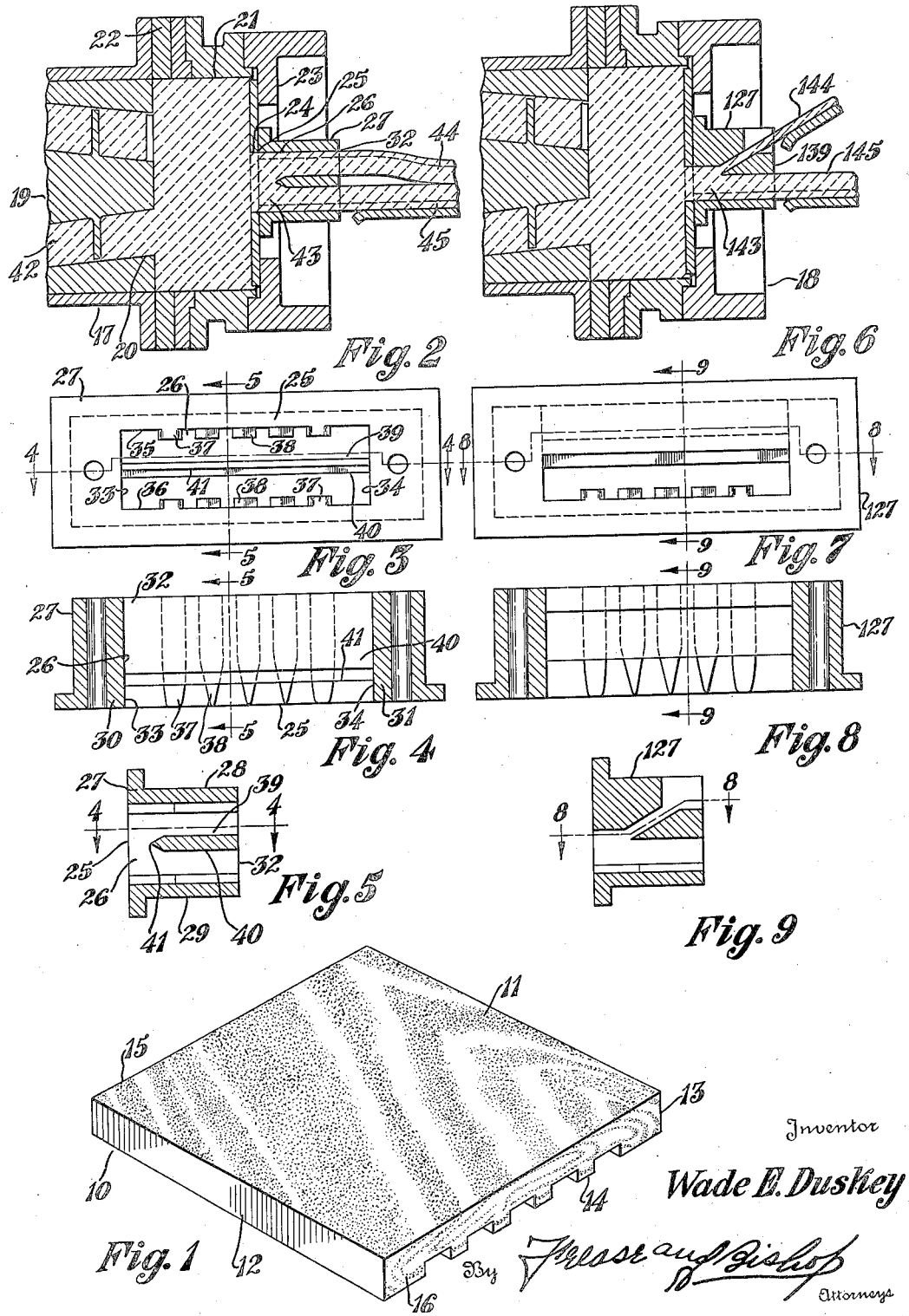

2,132,257

UNITED STATES PATENT OFFICE 2,132,257

CERAMIC MANUFACTURE

Wade E. Duskey, Parkersburg, W. Va., assignor to United States Quarry Tile Company, Canton, Ohio, a corporation of Delaware Application December 7, 1936, Serial No. 114,560

1 Claim. (Cl. 72—18)

The invention relates to extruded ceramic products, having smooth extruded faces, and more particularly to quarry tile for use as the exposed covering of floors and walls.

Quarry tile in a usual size are 6 inches square and ¾ inch thick and have a bottom face which is ribbed to facilitate setting of the tile.

The tile are made from a ceramic body which is pugged, and preferably passed through a deairing chamber, and then forced by a screw press through an extrusion die which ejects a ribbon column of formed clay having a top face, a ribbed bottom face, and side faces, all of which are smooth, and the ribbon of formed green clay is cut into green tile by a suitable wire cutting machine. The green tile are then dried and fired in a usual manner.

Quarry tile as heretofore made have had smooth extruded faces and have had a single or uniform color throughout which is usually red, excepting when the tile have been fire flashed.

Quarry tile of uniform color, when used over a large area of floor, are more or less monotonous in appearance and very quickly show dust tracks.

On the other hand it is virtually essential that such tile have a smooth extruded wearing or exposed face, among other reasons to prevent the accumulation of dirt and dust.

In the past, attempts have been made to provide a quarry tile having a variegated colored exposed face by fire flashing a variegated colored glaze on the tile, but such fire flashed variegated colored tile do not stand up in use, the glaze wearing away in a relatively short time.

It is known in the ceramic art that a ceramic body made of a mixture of constituents, such as clays, clays and shales, or shales, with or without coloring oxides, when pugged and extruded will produce a green column having internal laminations of the different constituents, which after being cut and fired will produce variegated colored transverse wire cut end faces, the laminations of the different materials of the body which are cut through by the wires each having a characteristic color.

In the usual extrusion process however the extruded faces all are formed of only one of the constituents of the body, and after being fired thus have only one color.

Heretofore in making brick of a mixture of body constituents which upon firing produce different colored laminations, after the brick column has been extruded from the forming die, a wire has been utilized to strip one of the extruded faces, but with a resulting rough surface which is entirely unsuited for quarry tile.

The objects of the present improvements are to provide a quarry tile adapted for use as a covering for floors and walls and which may have a smooth extruded wearing or exposed face having variegated colors which are produced by different colored laminations extending throughout the entire thickness of the tile, so that the wearing face will always be variegated in color regardless of the wear to which it is subjected.

Further objects of the present improvements are to provide an improved extrusion method for producing an improved quarry tile as above set forth.

Further objects of the present improvements are to provide improved extrusion apparatus for carrying out the improved extrusion method for making an improved quarry tile as above set forth.

The foregoing and other objects are attained by the quarry tile as an article of manufacture, and the methods, apparatus, processes, steps, combinations, and sub-combinations, which comprise the present invention, and the nature of which is set forth in the following general statement, and preferred details of which are set forth by way of example in the following description, and which are particularly and distinctly pointed out and set forth in the appended claims forming part hereof.

In general terms the improved quarry tile of the present invention has a body which is made of a mixture of constituents which may include clays, clays and shales, or shales, preferably with coloring oxides, the different constituents being arranged in laminations throughout the body of the tile, and the tile having smooth extruded faces one of which is a wearing or exposed face in which the laminations of the different constituents terminate in a smooth extruded face which in the finished fired tile is variegated in color, and the tile having wire cut end faces which are rough.

In general terms the improved method of the present invention includes forming a ceramic body of different constituents so that the different constituents are arranged in different laminations in the body, pressing the laminated body through a tubular die, longitudinally severing the ceramic body intermediate the ends of the tubular die, and then subjecting the extruded and longitudinally severed green body to the usual steps of wire cutting into tile, drying, and firing.

In general terms, the improved apparatus of the present invention adapted for carrying out the improved method includes in combination with a usual ceramic extrusion machine, preferably arranged for de-airing, a tubular extrusion die, having a severing member arranged within its tubular opening with a cutting edge located intermediate the entrance and exit ends of the die so that the clay column passing through the die and including laminations of different ceramic colors is first formed and compressed and then longitudinally severed, and then ejected from the die.

By way of example, one of the improved quarry tile of the present invention, and two embodiments of the improved apparatus for carrying out the improved method of the present invention, are illustrated in the accompanying drawing forming part hereof, in which Figure 1 is an isometric view of one of the improved quarry tile of the present invention, having a smooth variegated colored wearing or exposed face;

Fig. 2, a fragmentary longitudinal vertical sectional view of an extrusion apparatus including the present improvements, and adapted for carrying out the improved method hereof, and shown simultaneously extruding two upper and lower green ribbon columns which when wire cut into quarry tile lengths, make an upper and lower green quarry tile for each cut;

Fig. 3, a detached elevation view of the entrance end of the improved double tubular die of the apparatus of Fig. 2;

Fig. 4, a horizontal sectional view thereof as on line 4—4, Figs. 3 and 5;

Fig. 5, a vertical sectional view thereof as on line 5—5, Figs. 3 and 4;

Fig. 6, a view similar to Fig. 2 showing the improved apparatus hereof with an improved single tubular die adapted for making a single ribbon column from which the improved quarry tile hereof may be cut;

Fig. 7, a view similar to Fig. 3 of the entrance end of the die of the apparatus of Fig. 6;

Fig. 8, a horizontal sectional view thereof as on line 8—8, Figs. 7 and 9; and

Fig. 9, a vertical sectional view thereof as on line 9—9, Figs. 7 and 8.

Similar numerals refer to similar parts throughout the drawing.

One of the improved quarry tile of the present invention is illustrated in Fig. 1, and is indicated generally by 10, and has a variegated colored extruded and severed smooth wearing or exposed face 11, extruded smooth side faces 12 and 13, a grooved extruded smooth bottom face 14, and variegated colored wire cut end faces 15 and 16 which are rough.

The body of the tile consists of laminations of different ceramic constituents which terminate in the smooth extruded and severed wearing or exposed face 11 and thus provide the variegated color thereof, and the laminations terminate as well in the wire cut end faces 15 and 16 which are rough.

The body of the tile may be made of a mixture of ceramic constituents such as two shales, two clays, a clay and a shale, two clays and a shale, or two shales and a clay, with or without coloring oxides such as the oxides of cobalt, uranium, iron, manganese, chromium, or titanium.

The improved tile 10 may be made by the improved method hereof which may be carried out by the improved double tubular die plastic extrusion apparatus illustrated in Figs. 2, 3, 4, and 5 inclusive and indicated generally by 17, and by the improved single tubular die plastic extrusion apparatus illustrated in Figs. 6, 7, 8, and 9 inclusive and indicated generally by 18.

The improved apparatus 17 includes screw press means indicated generally by 19 having a discharge opening 20 communicating with a plug seal chamber 21 formed by side walls 22 and end walls 23. The end walls 23 have a central opening 24 formed therein which registers with the entrance end 25 of the tubular opening 26 of an improved double tubular die 27.

The improved double tubular die 27 is shown detached in Figs. 3, 4, and 5 and includes an upper wall 28, a lower wall 29 and side walls 30 and 31 forming as shown the rectangular tubular opening 26 having the entrance end 25 and an exit or discharge end 32.

As shown the inner tile forming faces 33 and 34 of the side die walls 30 and 31 respectively are flat, while the inner tile forming faces 35 and 36 of the upper and lower die walls 28 and 29 respectively are provided with groove forming tongues 37 and 38 which extend longitudinally in the direction of movement of the clay column passing through the die opening 26.

Intermediate the entrance and exit ends 24 and 32 of the die 27, severing means indicated generally by 39 are provided, as shown in the form of a blade 40 extending crosswise of the die opening midway between the upper and lower tile forming walls 35 and 36, and having a severing edge 41 which is directed towards and spaced from the entrance end 24 of the die 27.

In operation, the improved apparatus 17 is associated with a pug mill not shown and preferably with a de-airing chamber not shown of usual construction.

A mixture of plastic constituents, which for the particular purposes of the present invention are ceramic constituents, which may be for example mixtures of two shales, two clays, a clay and a shale, two clays and a shale, or two shales and a clay, with or without coloring oxides such as the oxides of cobalt, uranium, iron, manganese, chromium, or titanium, are fed into the pug mill and mixed therein and are then passed through the de-airing chamber from which the screw press means 19 receive the same, and form a green ceramic body 42 having laminations of the different plastic ceramic constituents which is fed into and fill the plug seal chamber 21 and is then fed into the entrance end 25 of the tubular opening 26 of the improved double die 27 in which the engirdling pressure of the die walls 28, 29, 30 and 31 and the endwise pressure of the screw press 19 form the green body into a moving rectangular column 43 which is then transversely severed by the severing means 39 intermediate the entrance and exit openings 26 and 32 of the die 27 into upper and lower green tile columns 44 and 45, from which a suitable wire cutting machine not shown cuts lengths of the same which for each cut consist of upper and lower green tile 10 whose opposite variegated colored faces 11 are formed by the terminations of the several laminations of the different ceramic constituents of the body.

The green tile 10 thus formed are then dried and fired in a usual manner.

The variegated colored face 11 of each of the improved tile as thus produced is not only variegated in color regardless of the amount of wear to which the tile is subjected, because the color variegation is the result of severing the laminations of the different ceramic constituents which extend through the entire body of the tile, but the face 11 is also smooth, arising from the fact that the severing of the green column 43 is performed by the severing means 39 while the column 43 is subject to the engirdling pressure of the die walls and the endwise pressure of the screw press means 19.

The single tubular die plastic extrusion apparatus 18 is generally similar to the apparatus 17 with the exception that the improved die 127 thereof is arranged to produce only a single lower green tile column 145, the severing means 139 of the die 127 merely serving to sever a thin strip 144 from the column 143, which strip 144 is returned to the pug mill not shown.

I claim:

An extruded ceramic article of manufacture having a body made of laminations of different ceramic constituents, and an extruded smooth exposed face in which the laminations terminate and provide variegated colors for the exposed face, extruded side and setting faces, and rough end faces in which the laminations terminate.

WADE E. DUSKEY.